US009876542B2

(12) United States Patent
Sampath et al.

(10) Patent No.: US 9,876,542 B2
(45) Date of Patent: Jan. 23, 2018

(54) BEAMFORMING FEEDBACK FORMAT

(71) Applicant: QUALCOMM Incorporated, San Diego, CA (US)

(72) Inventors: Hemanth Sampath, San Diego, CA (US); Sameer Vermani, San Diego, CA (US); Albert Van Zelst, Woerden (NL); Didier Johannes Richard Van Nee, Tull en't Waal (NL)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 14/718,537

(22) Filed: May 21, 2015

(65) Prior Publication Data

US 2015/0256240 A1 Sep. 10, 2015

Related U.S. Application Data

(62) Division of application No. 13/287,921, filed on Nov. 2, 2011, now Pat. No. 9,130,631.

(Continued)

(51) Int. Cl.
*H04B 7/02* (2006.01)
*H04B 7/0417* (2017.01)
(Continued)

(52) U.S. Cl.
CPC .......... *H04B 7/0417* (2013.01); *H04B 7/065* (2013.01); *H04B 7/0617* (2013.01);
(Continued)

(58) Field of Classification Search
CPC ..... H04L 1/0618; H04L 1/06; H04L 25/0204; H04L 27/2647; H04L 5/0007;
(Continued)

(56) References Cited

U.S. PATENT DOCUMENTS 7,142,864 B2 11/2006 Laroia et al.
7,486,655 B2 2/2009 Ting et al.
(Continued)

FOREIGN PATENT DOCUMENTS

CN 101577574 A 11/2009
EP 1672824 A2 6/2006
(Continued)

OTHER PUBLICATIONS

Etri., "Key Technology Issues for IEEE802.11ac Next Gen. WLAN", Jun. 28, 2010, pp. -63.
(Continued)

*Primary Examiner* — Zewdu Kassa
(74) *Attorney, Agent, or Firm* — Patterson & Sheridan, LLP

(57) ABSTRACT

Certain aspects of the present disclosure propose transmitting a feedback message to an access point. The feedback may comprise a beamforming extension field, which may carry per tone signal to noise ratio of a station. For certain aspects, the station transmitting the per-tone SNR may be a single user (SU)-capable device. For certain aspects, the station may indicate to the access point whether or not it has a maximum likelihood (ML) receiver.

34 Claims, 9 Drawing Sheets

Related U.S. Application Data

(60) Provisional application No. 61/409,907, filed on Nov. 3, 2010.

(51) Int. Cl.
*H04B 7/06* (2006.01)
*H04L 1/00* (2006.01)
*H04B 7/0413* (2017.01)

(52) U.S. Cl.
CPC ......... *H04B 7/0643* (2013.01); *H04L 1/0035* (2013.01); *H04L 1/0054* (2013.01); *H04B 7/0413* (2013.01); *H04B 7/0689* (2013.01)

(58) Field of Classification Search
CPC ............. H04L 27/2657; H04L 27/2662; H04L 5/0048; H04L 25/4902; H04L 1/0009; H04L 1/0041; H04L 25/49; H04B 7/0417; H04B 7/0669; H04B 3/54
USPC ................ 375/267, 260, 259, 295, 316, 219
See application file for complete search history.

(56) References Cited

U.S. PATENT DOCUMENTS

| | | | |
|---|---|---|---|
| 7,839,944 | B2 | 11/2010 | Lee et al. |
| 8,050,286 | B2 | 11/2011 | Jin et al. |
| 8,059,733 | B2 | 11/2011 | Khojastepour et al. |
| 8,238,277 | B2 | 8/2012 | Orlik et al. |
| 8,284,849 | B2 | 10/2012 | Lee et al. |
| 8,331,464 | B2 | 12/2012 | Lee et al. |
| 8,396,163 | B2 | 3/2013 | Collings et al. |
| 8,412,275 | B2 | 4/2013 | Kim et al. |
| 8,908,600 | B2 | 12/2014 | Sampath et al. |
| 9,191,875 | B1* | 11/2015 | Kazeminejad ...... H04W 52/245 |
| 2006/0250963 | A1 | 11/2006 | Jin et al. |
| 2006/0291544 | A1 | 12/2006 | Fischer et al. |
| 2007/0049218 | A1 | 3/2007 | Gorokhov et al. |
| 2007/0104288 | A1 | 5/2007 | Kim |
| 2007/0223423 | A1 | 9/2007 | Kim et al. |
| 2007/0253501 | A1 | 11/2007 | Yamaura |
| 2007/0258366 | A1 | 11/2007 | Imamura |
| 2007/0291829 | A1 | 12/2007 | Nabetani et al. |
| 2008/0080635 | A1 | 4/2008 | Hugl et al. |
| 2009/0325503 | A1 | 12/2009 | Tamazawa |
| 2010/0046667 | A1 | 2/2010 | Tsutsui |
| 2010/0099412 | A1 | 4/2010 | Ramachandran et al. |
| 2010/0103832 | A1 | 4/2010 | Zhou et al. |
| 2010/0111028 | A1 | 5/2010 | Kim et al. |
| 2010/0322351 | A1 | 12/2010 | Tang et al. |
| 2011/0002219 | A1 | 1/2011 | Kim et al. |
| 2011/0051636 | A1 | 3/2011 | Van Nee et al. |
| 2011/0069688 | A1 | 3/2011 | Zhang et al. |
| 2011/0096738 | A1 | 4/2011 | Choi |
| 2011/0110263 | A1 | 5/2011 | Yi et al. |
| 2011/0116488 | A1 | 5/2011 | Grandhi |
| 2011/0149842 | A1* | 6/2011 | Cordeiro .............. H04B 7/0491 370/328 |
| 2011/0158337 | A1* | 6/2011 | Li ......................... H04W 52/10 375/260 |
| 2011/0199968 | A1* | 8/2011 | Kim .................... H04B 7/0617 370/328 |
| 2011/0299517 | A1* | 12/2011 | Trainin ................ H04B 7/0417 370/338 |
| 2012/0250670 | A1 | 10/2012 | Cordeiro |
| 2012/0281620 | A1 | 11/2012 | Sampath et al. |
| 2013/0028344 | A1 | 1/2013 | Chen et al. |
| 2014/0254414 | A1* | 9/2014 | Zhang .................. H04L 1/0693 370/252 |

FOREIGN PATENT DOCUMENTS

| | | | |
|---|---|---|---|
| EP | 1816772 | A1 | 8/2007 |
| JP | 2007335994 | A | 12/2007 |
| JP | 2010011261 | A | 1/2010 |
| JP | 2010081092 | A | 4/2010 |
| JP | 2013501386 | A | 1/2013 |
| JP | 2013545339 | A | 12/2013 |
| WO | 2004095851 | A2 | 11/2004 |
| WO | 2007027825 | A2 | 3/2007 |
| WO | 2007077599 | A1 | 7/2007 |
| WO | 2007109635 | A1 | 9/2007 |
| WO | 2008050996 | A2 | 5/2008 |
| WO | 2008139630 | A1 | 11/2008 |
| WO | 2009027931 | A2 | 3/2009 |
| WO | 2010018433 | A1 | 2/2010 |
| WO | 2010029765 | A1 | 3/2010 |
| WO | WO 2011105680 | A2 * | 9/2011 ............ H04W 56/00 |
| WO | 2012047855 | A2 | 4/2012 |

OTHER PUBLICATIONS

"IEEE Standard for Information technology—Telecommunications and information exchange between systems—Local and metropolitan area networks—Specific requirements Part 11: Wireless LAN Medium Access Control (MAC) and Physical Layer (PHY) Specifications Amendment 5: Enhancements for Higher Throughput", IEEE Standard, IEEE, Piscataway, NJ, USA, Oct. 29, 2009, (Oct. 29, 2009), pp. 1-502, XP017604244, ISBN: 978-0-7381-6046-7. I IEEE Standard for Local and metropolitan area networks Part 16: Air Interface for Broadband Wireless Access Systems;IEEE Std 802.16-2009 (Revision of IEEE Std 802.16-2004), IEEE Standard, IEEE, Piscataway, NJ, USA, May 29, 2009 (May 29, 2009), pp. C1-2004, XP017604205, ISBN: 978-0-7381-5919-5 p. 358-p. 360. International Search Report and Written Opinion—PCT/US2011/059186—ISA/EPO—Apr. 3, 2012.

Mohsen Eslami, et al., "Efficient Transmission Technique for MIMO-OFDM Broadcast Channels with Limited Feedback", Spread Spectrum Techniques and Applications, 2008. ISSSTA '08. IEEE 10th International Symposium on, IEEE, Piscataway, NJ, USA, Aug. 25, 2008 (Aug. 25, 2008), pp. 237-241, XP031319014, ISBN: 978-1-4244-2203-6.

Stacey R., et al., "Specification Framework for TGac, IEEE 802.11-09/0992r17 [online]", Nov. 10, 2010, pp. 1-4, 32-34, URL, https://mentor.ieee.org/802.11/documents?is_dcn=0992&is_group=00ac.

Syafei W., et al., "A Gigabit MIMO WLAN system with international standardization strategy," Ntelligent Signal Processing and Communication Systems, 2009, 228-231.

Zhang H., et al., "11ac Explicit Feedback Format, IEEE 802.11-10/1227r0[online]", Nov. 9, 2010, Slides 1-29, URL, https://mentor.ieee.org/802.11/documents?is_group=00ac.

Zhang H., et al., "11ac Explicit Sounding and Feedback, 802.11-10/1105r0", IEEE 802.11 TGac, Sep. 14, 2010 (Sep. 14, 2010), XP55018327, pp. 1-43, Retrieved from the Internet: URL: https://mentor.ieee.org/802.11/ documents is dcn=1105&is group=00ac [retrieved on Feb. 2, 2012].

Zhang H., et al., "802.11ac Preamble", IEEE 802.11-10/0070r1, Feb. 10, 2010, pp. 1-23, URL, https://mentor.ieee.org/802.11/dcn/10/11-10-0070-01-00ac-802-11ac-preamble.ppt.

* cited by examiner

BEAMFORMING FEEDBACK FORMAT

CROSS-REFERENCE TO RELATED APPLICATIONS

This application is a divisional of U.S. patent application Ser. No. 13/287,921, filed Nov. 2, 2011, which claims priority of U.S. Provisional Patent Application No. 61/409,907, filed Nov. 3, 2010, assigned to the assignee hereof, and expressly incorporated herein by reference in its entirety.

BACKGROUND

Field

Certain aspects of the present disclosure generally relate to wireless communications and, more particularly, to a method for constructing a format for beamforming feedback for Very High Throughput (VHT) wireless systems.

Background

In order to address the issue of increasing bandwidth requirements that are demanded for wireless communication systems, different schemes are being developed to allow multiple user terminals to communicate with a single access point (AP) by sharing the channel resources while achieving high data throughputs. Multiple Input Multiple Output (MIMO) technology represents one such approach that has recently emerged as a popular technique for the next generation communication systems.

MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

In wireless networks with a single AP and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

SUMMARY

Certain aspects of the present disclosure provide an apparatus for wireless communications. The apparatus generally includes a receiver configured to receive a request for feedback, a circuit configured to generate, in response to the request for feedback, a feedback report frame comprising a multiple-input multiple-output (MIMO) control field having at least one beamforming (BF) extension bit indicating whether the feedback report frame includes a BF extension field, and a transmitter configured to transmit the feedback report frame.

Certain aspects of the present disclosure provide an apparatus for wireless communications. The apparatus generally includes a transmitter configured to transmit a request for feedback, a receiver configured to receive, in response to the request for feedback, a feedback report frame comprising a multiple-input multiple-output (MIMO) control field having at least one beamforming (BF) extension bit indicating whether the feedback report frame includes a BF extension field, and a circuit configured to determine if the at least one BF extension bit indicates the feedback report frame includes a BF extension field and, if so, process the BF extension field.

Certain aspects of the present disclosure provide an apparatus for wireless communications. The apparatus generally includes a circuit configured to generate a message comprising at least one bit indicating the apparatus comprises at least one receiver, the performance of which deteriorates when beamformed to and a transmitter configured to transmit the message.

Certain aspects of the present disclosure provide an apparatus for wireless communications. The apparatus generally includes a receiver configured to receive a message, from a device, comprising at least one bit indicating the device comprises at least one receiver, the performance of which deteriorates when beamformed to and a circuit configured to refrain from beamforming (BF) when transmitting to the device in response to detecting the bit.

Certain aspects of the present disclosure provide a method for wireless communications. The method generally includes receiving a request for feedback, generating, in response to the request for feedback, a feedback report frame comprising a multiple-input multiple-output (MIMO) control field having at least one beamforming (BF) extension bit indicating whether the feedback report frame includes a BF extension field, and transmitting the feedback report frame.

Certain aspects of the present disclosure provide a method for wireless communications. The method generally includes transmitting a request for feedback, receiving, in response to the request for feedback, a feedback report frame comprising a multiple-input multiple-output (MIMO) control field having at least one beamforming (BF) extension bit indicating whether the feedback report frame includes a BF extension field, and determining if the at least one BF extension bit indicates the feedback report frame includes a BF extension field and, if so, process the BF extension field.

Certain aspects of the present disclosure provide a method for wireless communications. The method generally includes generating a message comprising at least one bit indicating the apparatus comprises at least one receiver, the performance of which deteriorates when beamformed to and transmitting the message.

Certain aspects of the present disclosure provide a method for wireless communications. The method generally includes receiving a message, from a device, comprising at least one bit indicating the device comprises at least one receiver, the performance of which deteriorates when beamformed to and refraining from beamforming (BF) when transmitting to the device in response to detecting the bit.

Certain aspects of the present disclosure provide an apparatus for wireless communications. The apparatus generally includes means for receiving a request for feedback, means for generating, in response to the request for feedback, a feedback report frame comprising a multiple-input multiple-output (MIMO) control field having at least one beamforming (BF) extension bit indicating whether the feedback report frame includes a BF extension field, and means for transmitting the feedback report frame.

Certain aspects of the present disclosure provide an apparatus for wireless communications. The apparatus generally includes means for transmitting a request for feedback, means for receiving, in response to the request for feedback, a feedback report frame comprising a multiple-input multiple-output (MIMO) control field having at least one beamforming (BF) extension bit indicating whether the feedback report frame includes a BF extension field, and means for determining if the at least one BF extension bit indicates the feedback report frame includes a BF extension field and, if so, process the BF extension field.

Certain aspects of the present disclosure provide an apparatus for wireless communications. The apparatus generally includes means for generating a message comprising at least one bit indicating the apparatus comprises at least one receiver, the performance of which deteriorates when beamformed to and means for transmitting the message.

Certain aspects of the present disclosure provide an apparatus for wireless communications. The apparatus generally includes means for receiving a message, from a device, comprising at least one bit indicating the device comprises at least one receiver, the performance of which deteriorates when beamformed to and means for refraining from beamforming (BF) when transmitting to the device in response to detecting the bit.

Certain aspects of the present disclosure provide a computer-program product for wireless communications, comprising a computer-readable medium comprising instructions. The instructions are generally executable to receive a request for feedback, generate, in response to the request for feedback, a feedback report frame comprising a multiple-input multiple-output (MIMO) control field having at least one beamforming (BF) extension bit indicating whether the feedback report frame includes a BF extension field, and transmit the feedback report frame.

Certain aspects of the present disclosure provide a computer-program product for wireless communications, comprising a computer-readable medium comprising instructions. The instructions are generally executable to transmit a request for feedback, receive, in response to the request for feedback, a feedback report frame comprising a multiple-input multiple-output (MIMO) control field having at least one beamforming (BF) extension bit indicating whether the feedback report frame includes a BF extension field, and determine if the at least one BF extension bit indicates the feedback report frame includes a BF extension field and, if so, process the BF extension field.

Certain aspects of the present disclosure provide a computer-program product for wireless communications, comprising a computer-readable medium comprising instructions. The instructions are generally executable to generate a message comprising at least one bit indicating the apparatus comprises at least one receiver, the performance of which deteriorates when beamformed to and transmit the message Certain aspects of the present disclosure provide a computer-program product for wireless communications, comprising a computer-readable medium comprising instructions. The instructions are generally executable to receive a message, from a device, comprising at least one bit indicating the device comprises at least one receiver, the performance of which deteriorates when beamformed to and refrain from beamforming (BF) when transmitting to the device in response to detecting the bit.

Certain aspects of the present disclosure provide an access terminal. The access terminal generally includes at least one antenna, a receiver configured to receive, via the at least one antenna, a request for feedback, a circuit configured to generate, in response to the request for feedback, a feedback report frame comprising a multiple-input multiple-output (MIMO) control field having at least one beamforming (BF) extension bit indicating whether the feedback report frame includes a BF extension field, and a transmitter configured to transmit the feedback report frame Certain aspects of the present disclosure provide an access point. The access point generally includes at least one antenna, a transmitter configured to transmit, via the at least one antenna, a request for feedback, a receiver configured to receive, in response to the request for feedback, a feedback report frame comprising a multiple-input multiple-output (MIMO) control field having at least one beamforming (BF) extension bit indicating whether the feedback report frame includes a BF extension field, and a circuit configured to determine if the at least one BF extension bit indicates the feedback report frame includes a BF extension field and, if so, process the BF extension field.

Certain aspects of the present disclosure provide an access terminal. The access terminal generally includes at least one antenna, a circuit configured to generate a message comprising at least one bit indicating the apparatus comprises at least one receiver, the performance of which deteriorates when beamformed to, and a transmitter configured to transmit, via the at least one antenna, the message.

Certain aspects of the present disclosure provide an access point. The access point generally includes at least one antenna, a receiver configured to receive a message, via the at least one antenna from a device, comprising at least one bit indicating the device comprises at least one receiver, the performance of which deteriorates when beamformed to, and a circuit configured to refrain from beamforming (BF) when transmitting to the device in response to detecting the bit.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
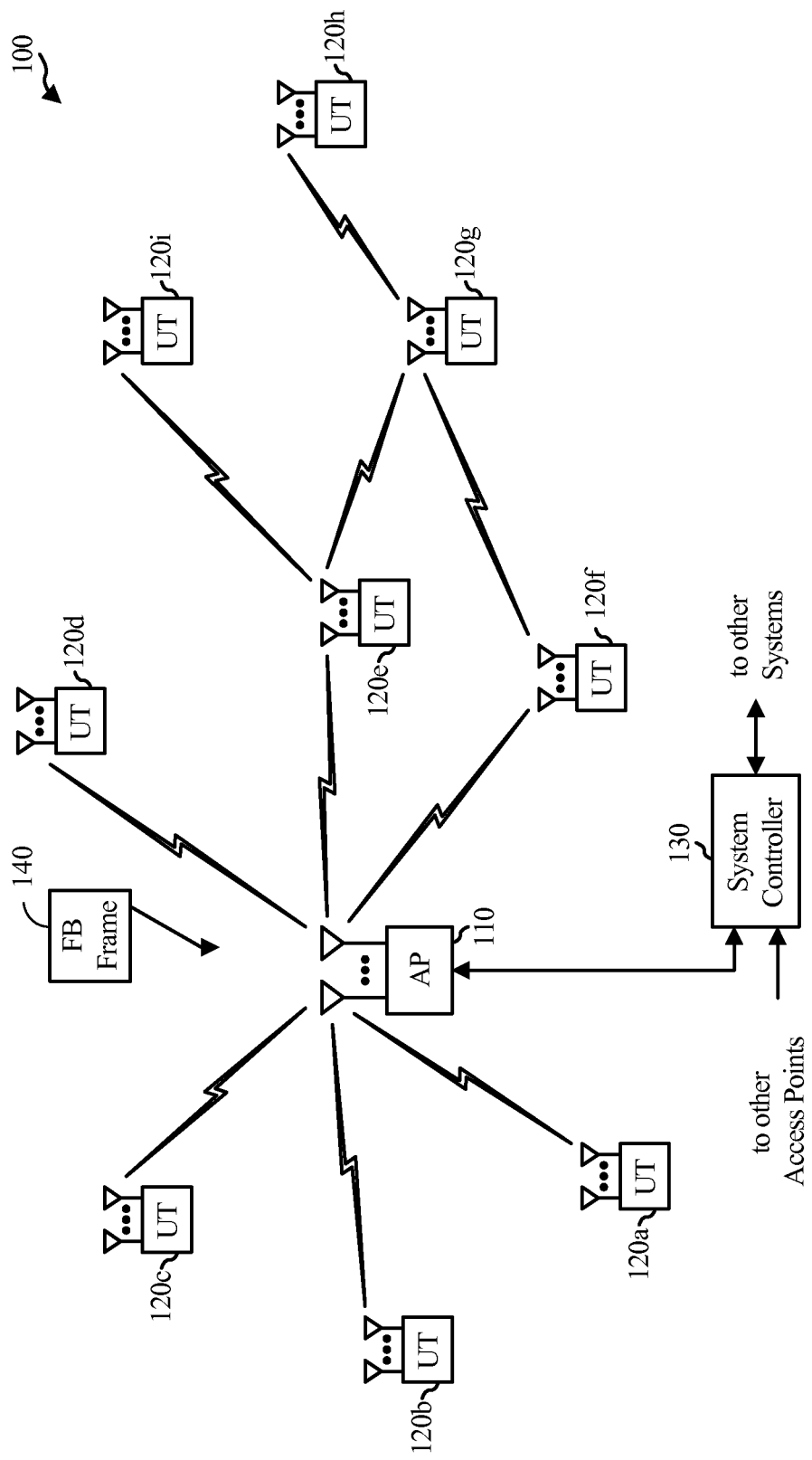
FIG. 1 illustrates a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on a single carrier transmission. Aspects disclosed herein may be, for example, advantageous to systems employing Ultra Wide Band (UWB) signals including millimeter-wave signals. However, the present disclosure is not intended to be limited to such systems, as other coded signals may benefit from similar advantages.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile terminal, a remote station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). MIMO system 100 may represent a high speed Wireless Local Area Network (WLAN) operating in a 60 GHz band.

Figure 2:
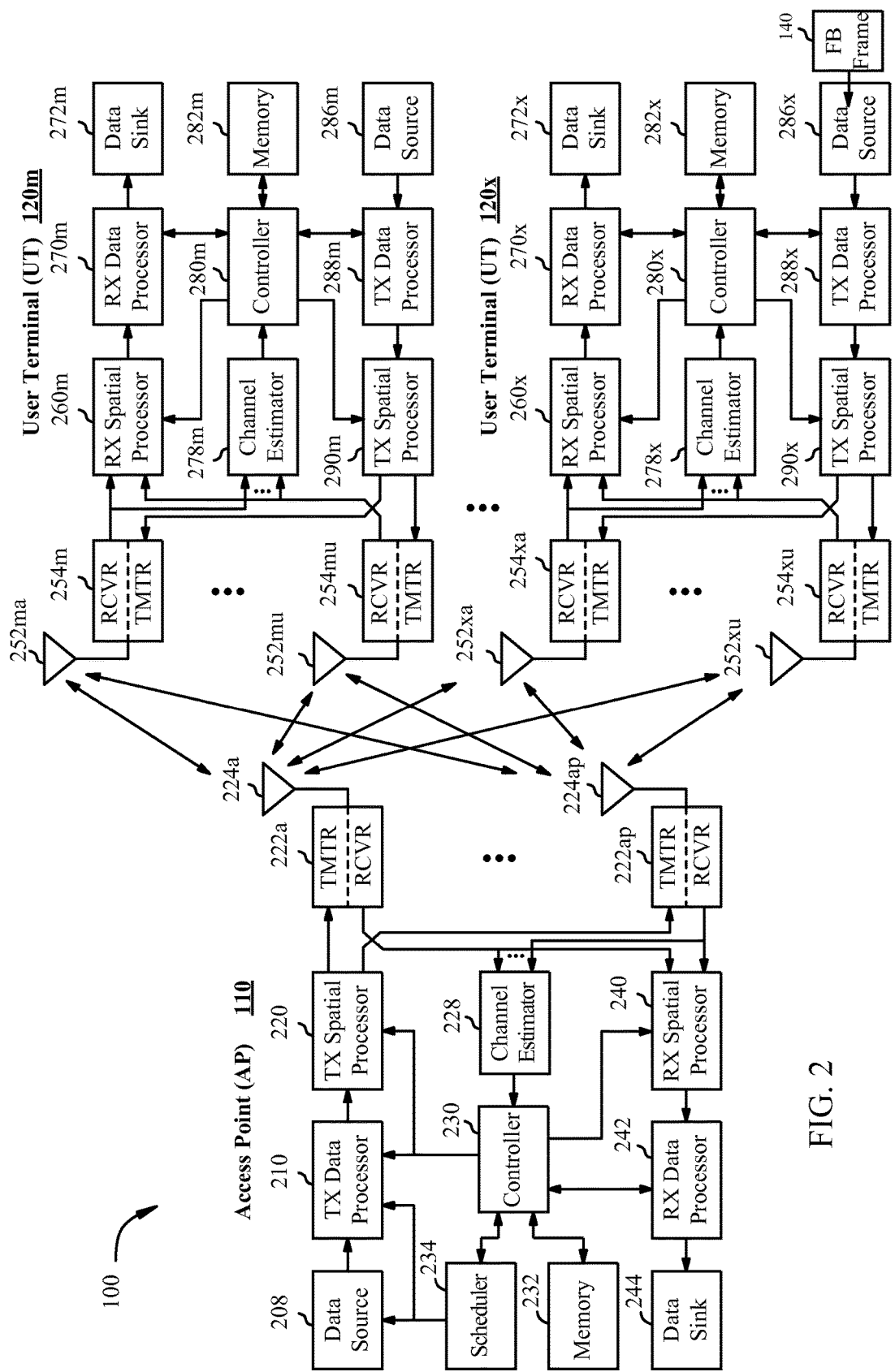
FIG. 2 illustrates a block diagram of an example access point and user terminals in accordance with certain aspects of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
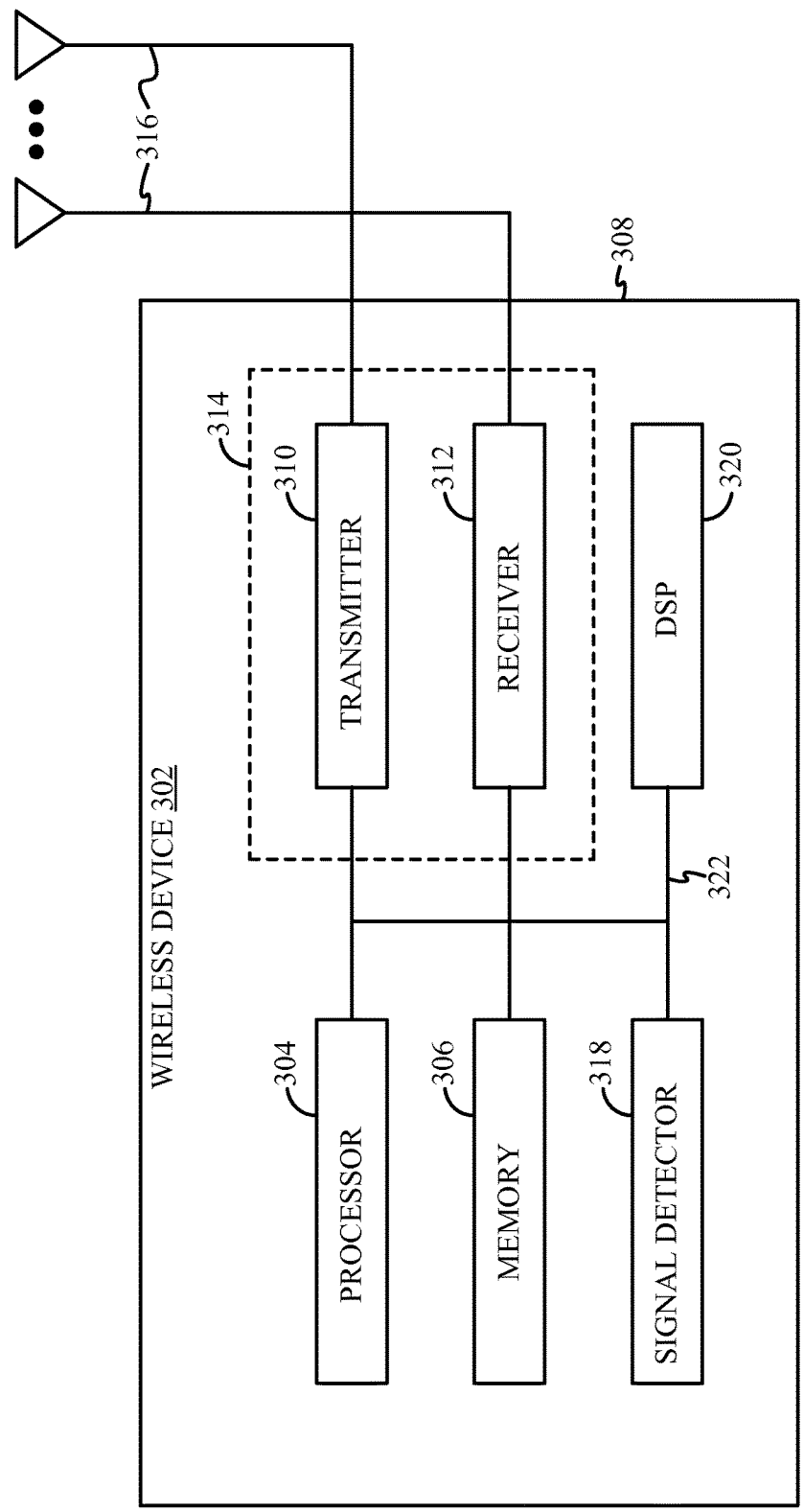
FIG. 3 illustrates a block diagram of an example wireless device in accordance with certain aspects of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain aspects of the present disclosure propose transmitting a feedback message to an access point. The feedback may comprise a beamforming extension field, which may carry per tone signal to noise ratio of a station. For certain aspects, the station transmitting the per-tone SNR may be a single user (SU)-capable device. For certain aspects, the station may indicate to the access point whether or not it has a maximum likelihood (ML) receiver. As used herein, an ML receiver generally refers to a receiver that performs maximum-likelihood detection (MLD).

Certain aspects of the present disclosure present methods for transmitting per tone signal to noise ratio to an access point by single user-capable devices. The knowledge of per tone SNR at an AP may benefit SU transmit beamforming transmissions. For example, per tone SNR may help minimum mean square error (MMSE) and zero forcing (ZF) receivers when the number of transmit antennas and receive antennas equals the number of spatial streams (e.g., Ntx=Nrx=Nss). This condition may be due to the equal modulation and coding scheme (MCS) restriction in the systems that may be in compliance with the IEEE 802.11ac.

Figure 4:
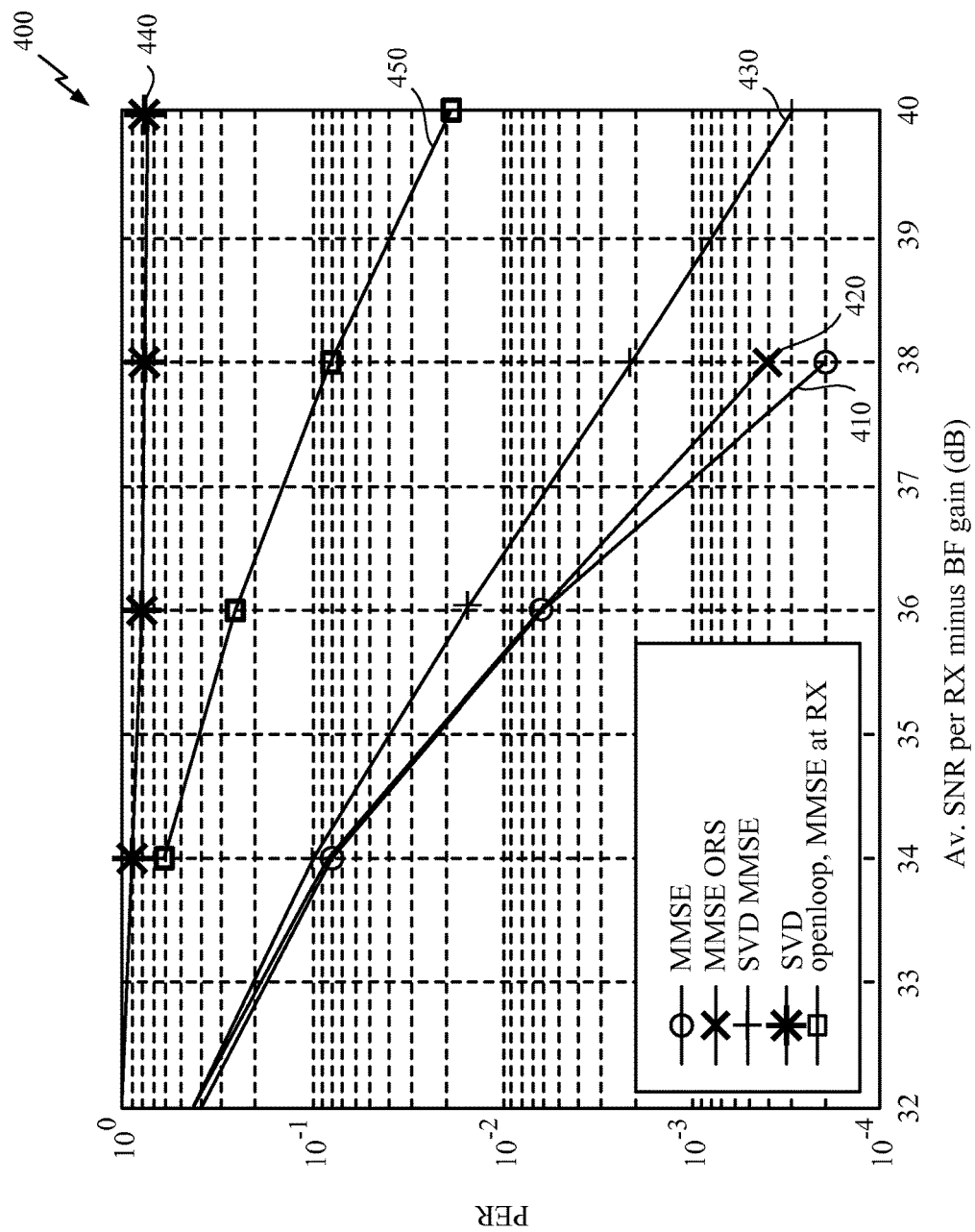
FIG. 4 illustrates example performance results for different feedback types in accordance with certain aspects of the present disclosure.

FIG. 4 illustrates example performance results 400 for different feedback types in accordance with certain aspects of the present disclosure. There may be four transmit antennas at an AP and four receive antennas at one or more user stations (STAs), 64-QAM modulation may be applied before transmission, and coding rate may be 5/6.

As illustrated, plot 410 which represents a 4×4 with MMSE receivers has performance gain compared to the open loop (curve 450). It should be noted that beamforming (BF) with V alone (curve 440) may not perform well. On the other hand, MMSE Precoding with V+S (curve 430) gives performance gain. The V matrix may be obtained using a singular value decomposition (SVD) of a wireless channel matrix H. For example, the matrix V may comprise a matrix of right eigen-vectors of the wireless channel. Alternatively, the matrix V may comprise a matrix of left eigen-vectors of the wireless channel. The feedback may comprise one or more columns of the V matrix and one or more columns of S matrix, wherein the matrix S may be obtained using the SVD of the channel matrix H. For example, the matrix S may comprise a matrix of eigenvalues of the wireless channel.

Certain aspects propose a method that allows the devices that support SU to send per tone SNR field to an access point, if need be, to get improved performance. However, the SU device may choose not to transmit per tone SNR. The proposed method allows the device (e.g., the beamformee) to be in-control of the decision whether or not to transmit per tone SNR and results in savings in terms of overhead.

Figure 5:
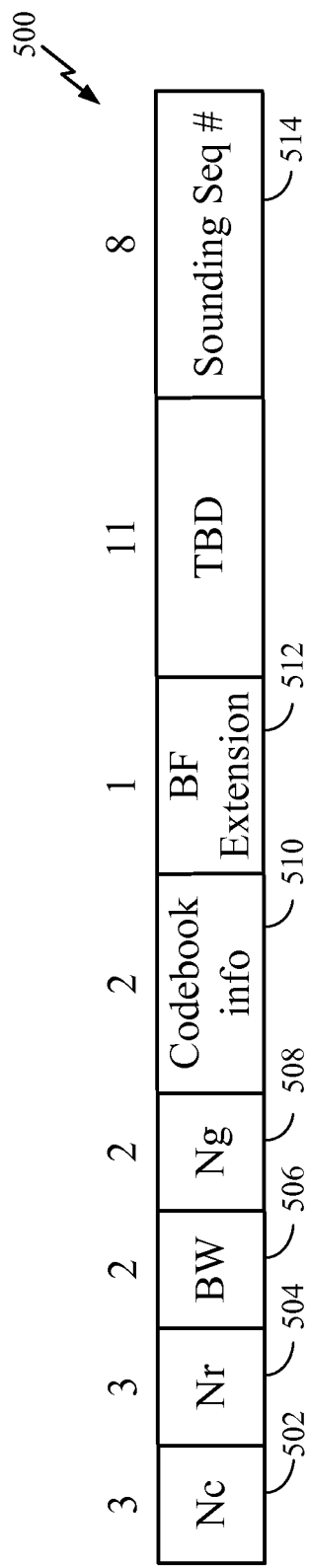
FIG. 5 illustrates an example feedback format in accordance with certain aspects of the present disclosure.

FIG. 5 illustrates an example feedback format 500 in accordance with certain aspects of the present disclosure. The structure 500 may represent VHT MIMO control field of the feedback.

Bits 502 (e.g., three bits) may correspond to columns of matrices V or H, and bits 504 (e.g., three bits) may correspond to row of matrices V or H. Bits 506 (e.g., two bits) may correspond to a bandwidth (BW) size, e.g., the value of 0 may indicate BW size of 20 MHz, the value of 1 may indicate BW size of 40 MHz, the value of 2 may indicate BW size of 80 MHz, and the value of 3 may indicate BW size of 160 MHz. Bits 508 (e.g., two bits) may comprise Ng parameter for tone grouping (an indication about sampling of the CSI feedback), wherein the value of 1 may indicate that Ng=2, the value of 2 may indicate that Ng=3, and the value of 3 may indicate that Ng=4.

Bits 510 (e.g., two bits) may comprise codebook information, such as bit resolution for Given's rotations angles ψ and φ (nomenclature of angles is same as in IEEE 802.11n wireless communications standard). A BF extension bit may be indicated by a bit field 512. The BF extension bit may indicate the presence of BF extension field in the feedback.

For certain aspects, multi user (MU) capable devices may transmit the BF extension field, upon indication that MU-type feedback is requested. For certain aspect, SU capable devices may or may not transmit the BF extension field.

For certain aspects, if the BF extension bit is set to zero, the feedback message may not include the BF extension field. In addition, if the BF extension bit is set to one, the feedback message may include the BF extension field.

For certain aspects, a station which is capable of receiving MU-MIMO may be required to include per tine SNR upon indication that MU-type feedback is requested. A station which is either not capable of receiving MU-MIMO or following a request for SU-type feedback may decide whether or not to report per tone SNR in the feedback message.

For certain aspects, the BF extension field may be used by the VHT compressed beamforming frame to carry SNR information for each subcarrier. The BF extension field may be included in the feedback report field only if BF extension bit in VHT-MIMO control field is set to one.

Figure 6:
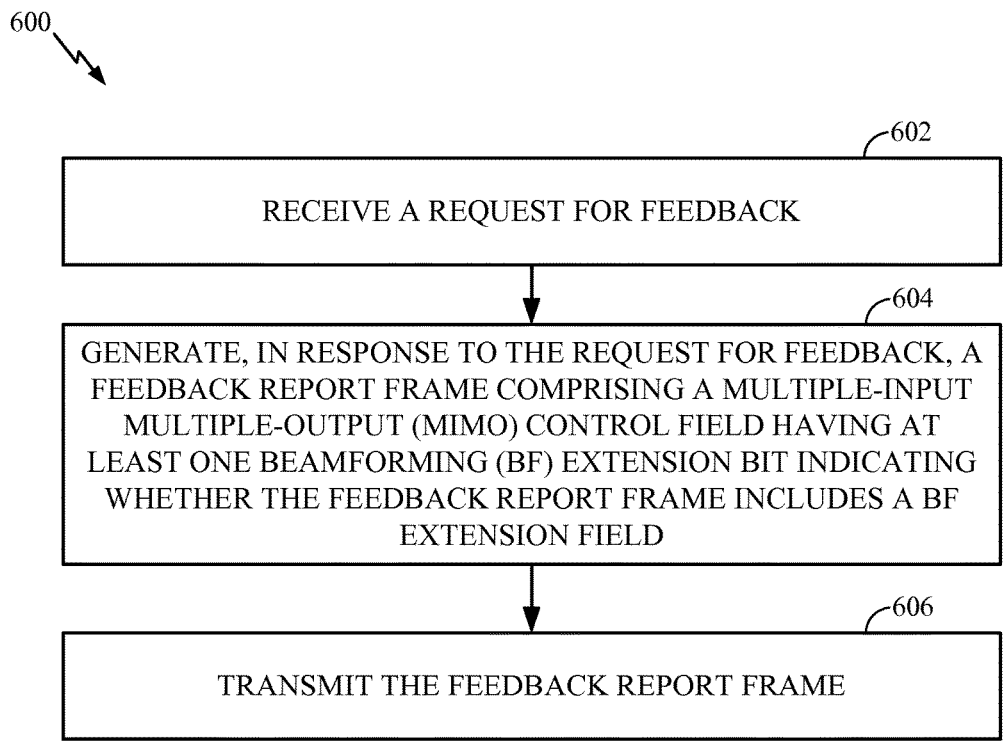
FIG. 6 illustrates example operations for transmitting a feedback message comprising a beamforming extension field that may be performed by a station, in accordance with certain aspects of the present disclosure.
Figure 6A:
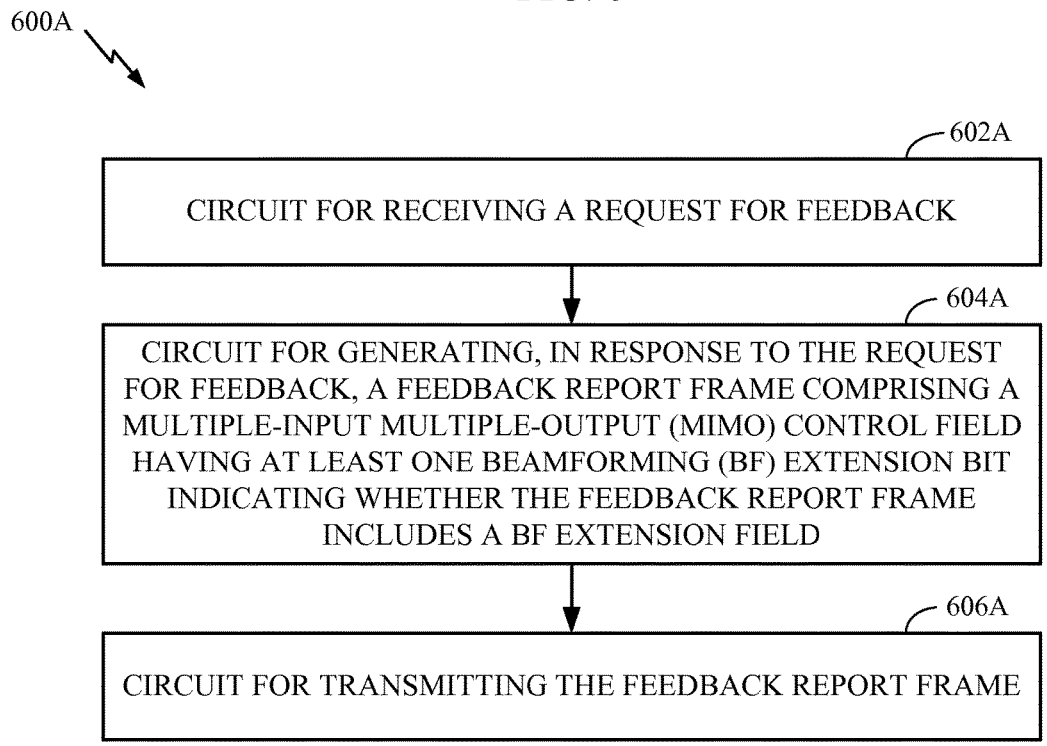
FIG. 6A illustrates example components capable of performing the operations of FIG. 6.

FIG. 6 illustrates example operations for transmitting a feedback message comprising a beamforming extension field that may be performed by a station, in accordance with certain aspects of the present disclosure. At 602, the station may receive a request for feedback. At 604, the station may generate, in response to the request for feedback, a feedback report frame comprising a multiple-input multiple-output (MIMO) control field having at least one beamforming (BF) extension bit indicating whether the feedback report frame includes a BF extension field. At 606, the station may transmit the feedback report frame.

Figure 7:
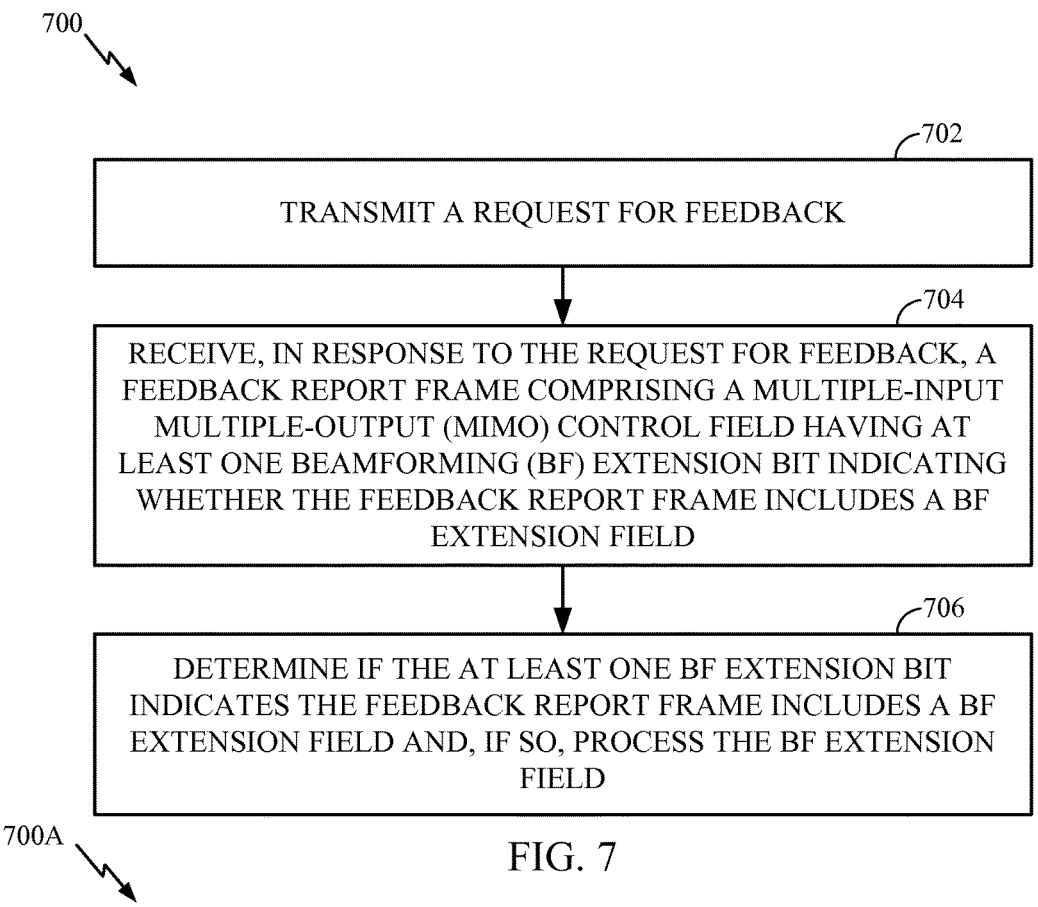
FIG. 7 illustrates example operations for receiving a feedback message comprising a beamforming extension field that may be performed by an access point, in accordance with certain aspects of the present disclosure.
Figure 7A:
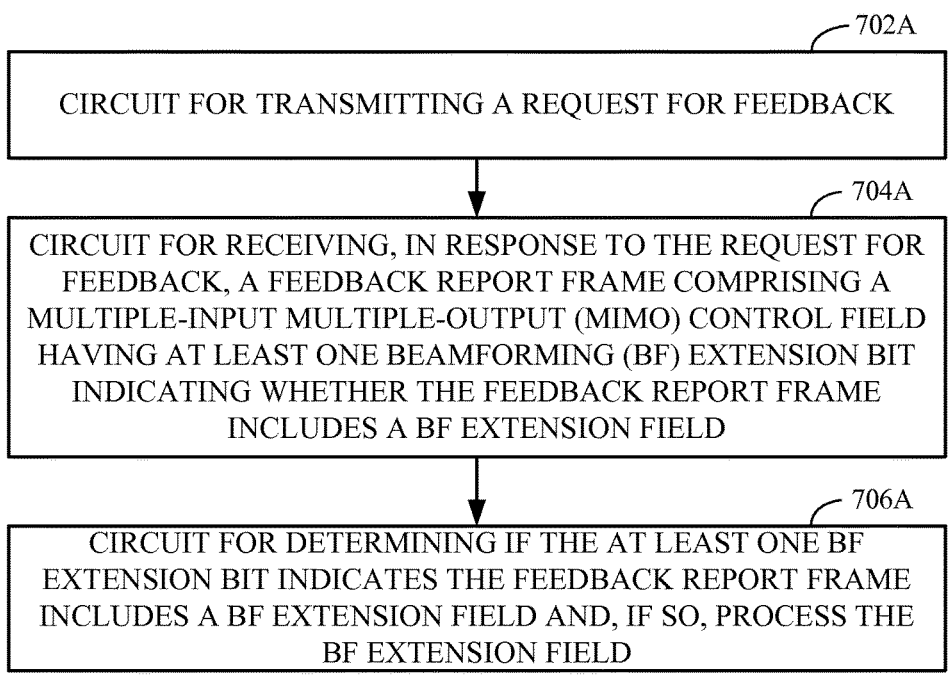
FIG. 7A illustrates example components capable of performing the operations of FIG. 7.

FIG. 7 illustrates example operations for receiving a feedback message comprising a beamforming extension field that may be performed by an access point, in accordance with certain aspects of the present disclosure. At 702, the AP may transmit a request for feedback to a station. At 704, the AP may receive, in response to the request for feedback, a feedback report frame comprising a multiple-input multiple-output (MIMO) control field having at least one beamforming (BF) extension bit indicating whether the feedback report frame includes a BF extension field.

For certain aspects, stations that are utilizing maximum likelihood (ML) receivers may prefer open loop transmissions when number of transmit antennas are equal to the number of receive antennas and are equal to the number of spatial streams ($N_{tx}=N_{rx}=N_{ss}$). Therefore, the station may inform an AP that it has an ML receiver. For example, the station may send an "ML bit" to tell the AP if the STA has an ML receiver. For certain aspects, the ML bit may be part of VHT MIMO control field or it may be a capability bit.

For certain aspects, the AP may not transmit beamformed signal to a device whenever $N_{tx}=N_{rx}=N_{Ss}$, and ML bit is set to one.

Figure 8:
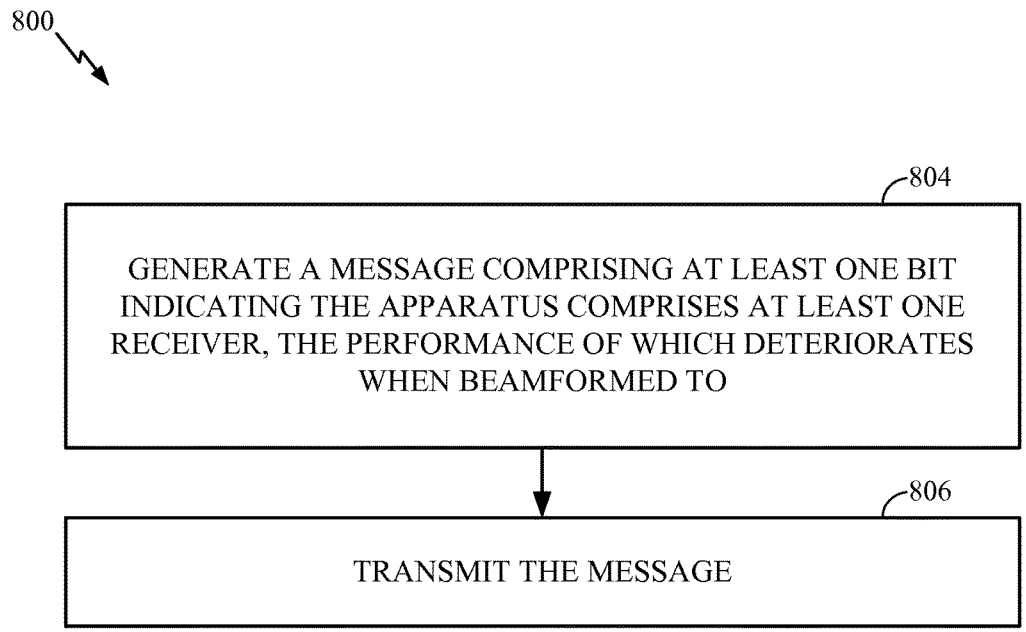
FIG. 8 illustrates example operations for transmitting an indication of presence of maximum likelihood receiver in a station, in accordance with certain aspects of the present disclosure.
Figure 8A:
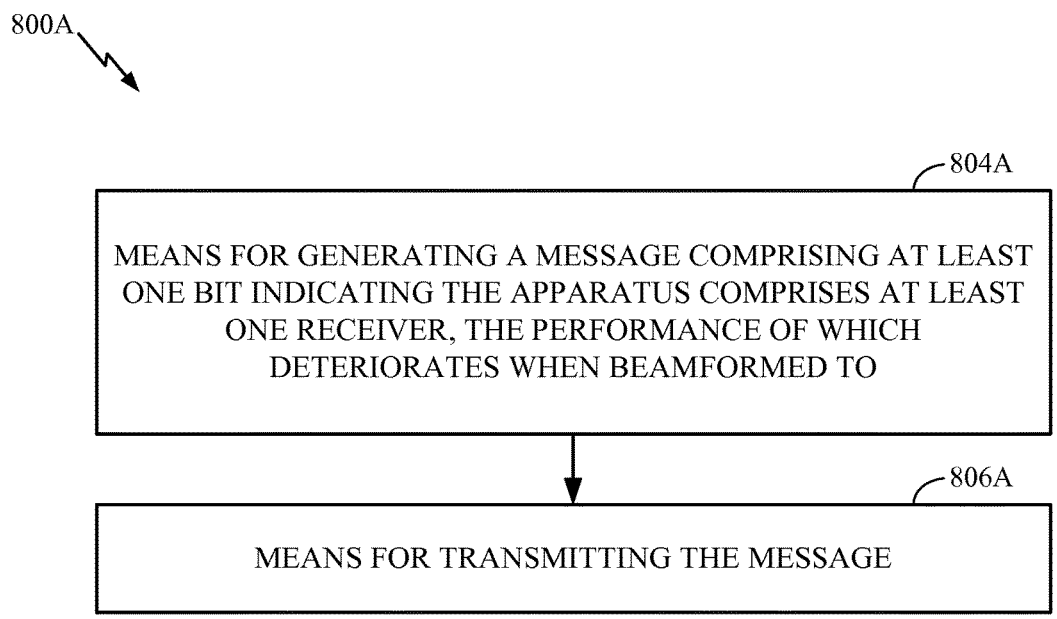
FIG. 8A illustrates example components capable of performing the operations of FIG. 8.

FIG. 8 illustrates example operations for transmitting an indication of presence of maximum likelihood receiver in a station, in accordance with certain aspects of the present disclosure. The station may comprise at least one maximum-likelihood (ML) receiver. At 804, the station may generate a message comprising at least one bit indicating the station comprises the at least one ML receiver. At 806, the station may transmit the message.

Figure 9:
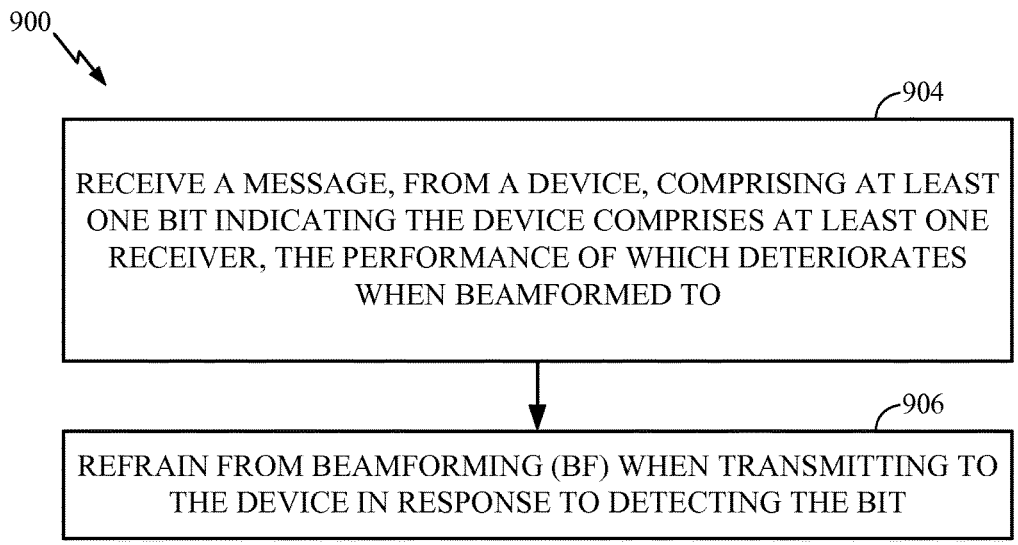
FIG. 9 illustrates example operations for receiving an indication of presence of maximum likelihood receiver in an apparatus that may be performed by an access point, in accordance with certain aspects of the present disclosure.
Figure 9A:
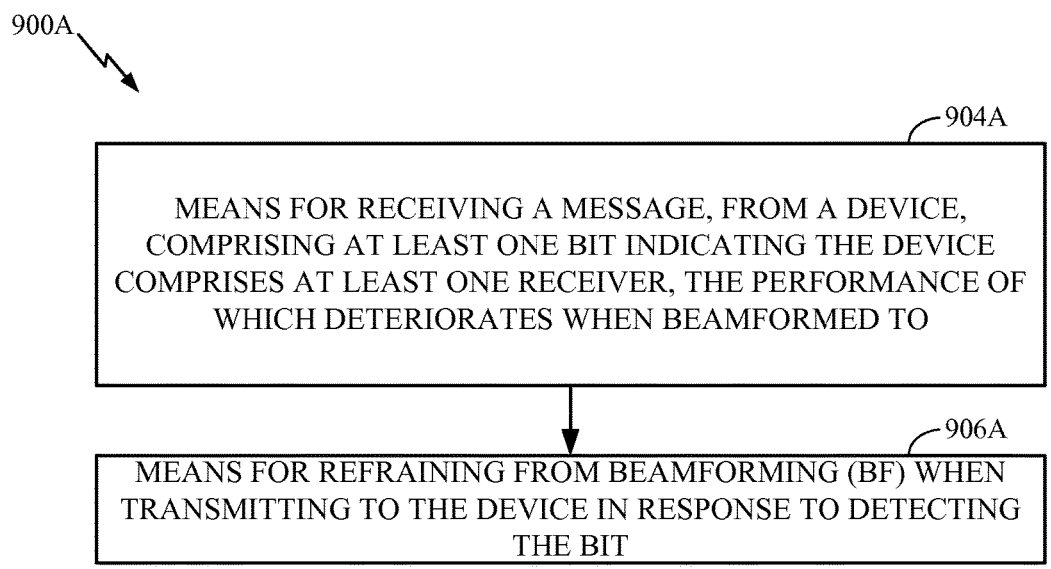
FIG. 9A illustrates example components capable of performing the operations of FIG. 9.

FIG. 9 illustrates example operations for receiving an indication of presence of maximum likelihood receiver in an apparatus that may be performed by an access point, in accordance with certain aspects of the present disclosure. At 904, the AP may receive a message comprising at least one bit indicating the apparatus comprises at least one ML receiver. At 906, the AP may refrain from beamforming (BF) when transmitting to the apparatus.

As described herein, a station may provide an indication of various information within a feedback message. For example, the information may include an indication the feedback message has a beamforming extension field (e.g., indicating what type of capability-if multi-user capable or no such capability, single-user only) or a bit that indicates the station has a receiver the performance of which deteriorates when beamformed to (such as an ML receiver). Upon detecting such information in the feedback message, an access point may determine how act or process accordingly (e.g., processing the more detailed beamforming information, if present, or refraining from beamforming to the device to prevent poor performance).

The various operations of methods described above may be performed by any suitable means capable of performing the corresponding functions. The means may include various hardware and/or software component(s) and/or module (s), including, but not limited to a circuit, an application specific integrate circuit (ASIC), or processor. Generally, where there are operations illustrated in Figures, those operations may have corresponding counterpart means-plus-function components with similar numbering. For example, operations 600, 700, 800 and 900 illustrated in FIGS. 6, 7, 8 and 9 correspond to components 600A, 700A, 800A and 900A illustrated in FIGS. 6A, 7A, 8A and 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

For example, the means for transmitting may comprise a transmitter, e.g., the transmitter 254 from FIG. 2 of the user terminal 120 or the transmitter 310 from FIG. 3 of the wireless device 302. The means for generating may comprise an application specific integrate circuit, e.g., the TX Spatial processor 290 from FIG. 2 of the user terminal 120 or the processor 304 from FIG. 3 of the wireless device 302. The means for determining may comprise an application specific integrate circuit, e.g., the TX Spatial processor 290 from FIG. 2 of the user terminal 120 or the processor 304 from FIG. 3 of the wireless device 302.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. An apparatus for wireless communications, comprising:
   at least one receiver;
   a circuit configured to generate a message comprising at least one bit indicating performance of the at least one receiver would deteriorate when beamformed to; and
   a transmitter configured to transmit the message to a device, wherein after transmitting the message, the at least one receiver is configured to receive a non-beamformed signal from the device.

2. The apparatus of claim 1, wherein the at least one bit comprises a capability bit.

3. The apparatus of claim 1, wherein the at least one bit comprises a bit of a multiple-input multiple-output (MIMO) control field.

4. The apparatus of claim 1, wherein the at least one bit causes the device receiving the message to refrain from beamforming when transmitting to the apparatus.

5. The apparatus of claim 1, wherein the at least one receiver comprises a maximum-likelihood (ML) receiver.

6. The apparatus of claim 1, wherein the circuit is configured to generate the message comprising the at least one bit to prevent the device from using beamforming when transmitting to the apparatus.

7. An apparatus for wireless communications, comprising:
   a receiver configured to receive a message, from a device, comprising at least one bit indicating the device comprises at least one receiver, the performance of which deteriorates when beamformed to; and
   a circuit configured to refrain from beamforming when transmitting to the device in response to detecting the at least one bit.

8. The apparatus of claim 7, wherein the at least one bit comprises a capability bit.

9. The apparatus of claim 7, wherein the at least one bit comprises a bit of a multiple-input multiple-output (MIMO) control field.

10. The apparatus of claim 7, wherein the apparatus is configured to transmit to the device using beamforming prior to receiving the message.

11. A method for wireless communications by an apparatus, comprising:
    generating a message comprising at least one bit indicating performance of at least one receiver of the apparatus would deteriorate when beamformed to;
    transmitting the message to a device; and
    after transmitting the message, receiving a non-beamformed signal from the device.

12. The method of claim 11, wherein the at least one bit comprises a capability bit.

13. The method of claim 11, wherein the at least one bit comprises a bit of a multiple-input multiple-output (MIMO) control field.

14. The method of claim 11, wherein the at least one bit causes the device receiving the message to refrain from beamforming when transmitting to the apparatus.

15. The method of claim 11, wherein the at least one receiver comprises a maximum-likelihood (ML) receiver.

16. The method of claim 11, wherein the message comprising the at least one bit is generated to prevent the device from using beamforming when transmitting to the apparatus.

17. A method for wireless communications, comprising:
receiving a message, from a device, comprising at least one bit indicating the device comprises at least one receiver, the performance of which deteriorates when beamformed to; and
refraining from beamforming when transmitting to the device in response to detecting the at least one bit.

18. The method of claim 17, wherein the at least one bit comprises a capability bit.

19. The method of claim 17, wherein the at least one bit comprises a bit of a multiple-input multiple-output (MIMO) control field.

20. The method of claim 17, further comprising transmitting to the device using beamforming prior to receiving the message.

21. An apparatus for wireless communications, comprising:
means for generating a message comprising at least one bit indicating performance of at least one receiver of the apparatus would deteriorate when beamformed to;
means for transmitting the message to a device; and
means for, after transmitting the message, receiving a non-beamformed signal from the device.

22. The apparatus of claim 21, wherein the at least one bit comprises a capability bit.

23. The apparatus of claim 21, wherein the at least one bit comprises a bit of a multiple-input multiple-output (MIMO) control field.

24. The apparatus of claim 21, wherein the at least one bit causes the device receiving the message to refrain from beamforming when transmitting to the apparatus.

25. The apparatus of claim 21, wherein the at least one receiver comprises a maximum-likelihood (ML) receiver.

26. The apparatus of claim 21, wherein the message comprising the at least one bit is generated to prevent the device from using beamforming when transmitting to the apparatus.

27. An apparatus for wireless communications, comprising:
means for receiving a message, from a device, comprising at least one bit indicating the device comprises at least one receiver, the performance of which deteriorates when beamformed to; and
means for refraining from beamforming when transmitting to the device in response to detecting the at least one bit.

28. The apparatus of claim 27, wherein the at least one bit comprises a capability bit.

29. The apparatus of claim 27, wherein the at least one bit comprises a bit of a multiple-input multiple-output (MIMO) control field.

30. The apparatus of claim 27, further comprising means for transmitting to the device using beamforming prior to receiving the message.

31. A non-transitory computer-readable medium comprising instructions executable to:
generate, by an apparatus, a message comprising at least one bit indicating performance of at least one receiver of the apparatus would deteriorate when beamformed to;
transmit, by the apparatus, the message to a device; and
after transmitting the message, receive, by the apparatus, a non-beamformed signal from the device.

32. A non-transitory computer-readable medium comprising instructions executable to:
receive, by an apparatus, a message, from a device, comprising at least one bit indicating the device comprises at least one receiver, the performance of which deteriorates when beamformed to; and
refrain, by the apparatus, from beamforming when transmitting to the device in response to detecting the at least one bit.

33. An access terminal, comprising:
at least one antenna;
at least one receiver;
a circuit configured to generate a message comprising at least one bit indicating performance of the at least one receiver would deteriorate when beamformed to; and
a transmitter configured to transmit, via the at least one antenna, the message to a device, wherein after transmitting the message, the at least one receiver is configured to receive a non-beamformed signal from the device.

34. An access point, comprising:
at least one antenna;
a receiver configured to receive a message, via the at least one antenna from a device, comprising at least one bit indicating the device comprises at least one receiver, the performance of which deteriorates when beamformed to; and
a circuit configured to refrain from beamforming when transmitting to the device in response to detecting the at least one bit.

* * * * *